Figure 1:
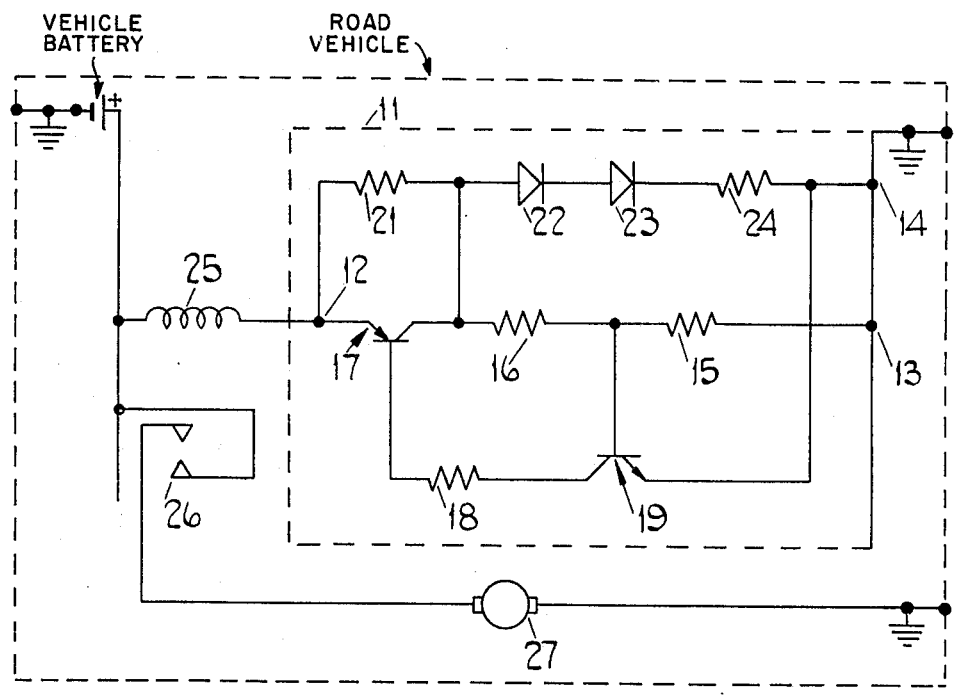

United States Patent [19]
Hill

[11] 3,982,163

[45] Sept. 21, 1976

[54] TEMPERATURE SENSITIVE ELECTRONIC SWITCHING ARRANGEMENTS

[75] Inventor: William Frank Hill, Stafford, England

[73] Assignee: The Lucas Electrical Company Limited, Birmingham, England

[22] Filed: Dec. 3, 1973

[21] Appl. No.: 420,897

[30] Foreign Application Priority Data
Dec. 2, 1972 United Kingdom............... 55798/72

[52] U.S. Cl. ............................... 318/473; 307/10 R; 317/132
[51] Int. Cl.² ........................................ G05D 23/30
[58] Field of Search................... 318/473, 472, 471; 307/117, 10 R; 219/505; 317/132

[56] References Cited
UNITED STATES PATENTS

| | | | |
|---|---|---|---|
| 2,945,133 | 7/1960 | Pinckaers | 317/132 X |
| 2,991,405 | 7/1961 | Carlson | 318/471 |
| 3,500,074 | 3/1970 | Obenhaus | 318/473 UX |
| 3,512,372 | 5/1970 | Kusuda et al. | 307/117 X |
| 3,514,966 | 6/1970 | Kusud et al. | 307/117 X |
| 3,666,990 | 5/1972 | Strobl | 318/473 X |
| 3,695,054 | 10/1972 | Barry | 318/473 X |
| 3,794,896 | 2/1974 | Holt | 318/473 X |

*Primary Examiner*—B. Dobeck
*Attorney, Agent, or Firm*—Holman & Stern

[57] ABSTRACT

A temperature sensitive electronic switching arrangement has a casing with two terminals, one of which may be constituted by the casing. In the casing is a positive temperature coefficient resistor and associated trigger circuit. As the temperature rises, a point is reached at which the circuit between the casing terminals changes from a high resistance to a low resistance. The arrangement has many uses, particularly in road vehicles.

13 Claims, 2 Drawing Figures

U.S. Patent  Sept. 21, 1976  3,982,163

TEMPERATURE SENSITIVE ELECTRONIC SWITCHING ARRANGEMENTS

This invention relates to temperature sensitive electronic switching arrangements, particularly for use in controlling a cooling fan on a road vehicle.

An arrangement according to one aspect of the invention comprises in combination a casing, a pair of terminals on the casing, and a trigger circuit and associated thermistor within the casing, the thermistor having a resistance which increases with temperature and at a predetermined temperature drives the trigger circuit from a first state, in which a high resistance path is provided between the terminals, to a second state, in which a low resistance path is provided between the terminals.

An arrangement according to another aspect of the invention comprises in combination an electrically conductive casing, an output terminal on but insulated from the casing, a series circuit coupling the output terminal and casing and including a resistor and a thermistor the resistance of which increases with increasing temperature, a transistor having its base-emitter connected across the thermistor, the transistor conducting in use when the resistance of the thermistor rises to a set value, said transistor forming part of a trigger circuit which switches on rapidly when the transistor starts to conduct, and provides a low resistance path between the output terminal and casing.

Figure 2:
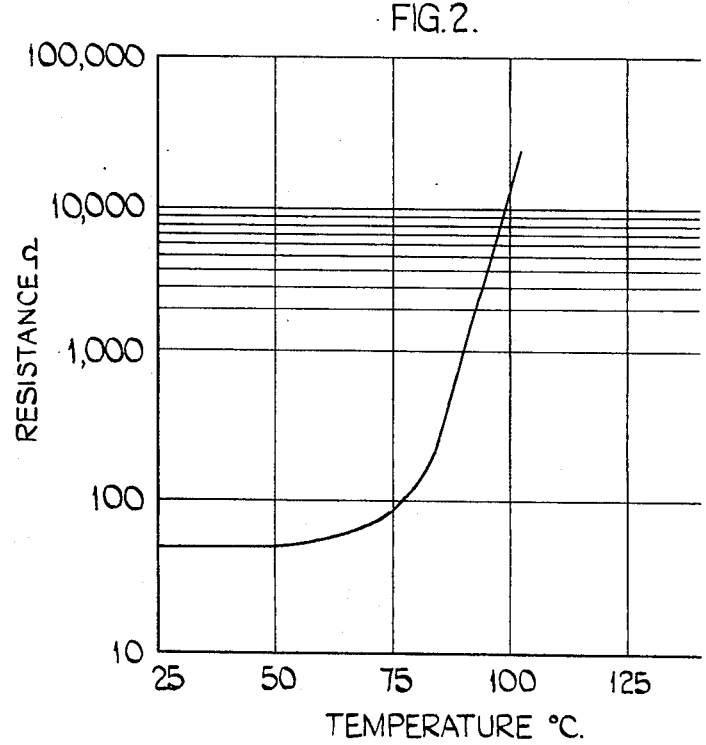

In the accompanying drawings,

FIG. 1 is a circuit diagram illustrating one example of the switching arrangement used in conjunction with a cooling fan on a road vehicle, and FIG. 2 is a graph illustrating the temperature characteristics of a thermistor used in FIG. 1.

Referring first to FIG. 1, the switching arrangement includes an electrically conductive casing 11 having an output terminal 12 insulated from the casing 11 together with a pair of terminal portions 13, 14 which are electrically connected to the casing 11. The casing has its earth connection made by mounting the casing on the radiator header tank or the engine cylinder head of a road vehicle, so that only one lead to the arrangement is required, namely the lead to the terminal 12. Moreover, a thermistor 15 within the casing is so mounted that when the casing is in position, the thermistor will be in good thermal contact, by way of the casing 11, with the coolant used in the road vehicle.

Referring now to the circuit in more detail, the thermistor 15 has one end connected to the terminal portion 13, and its other end connected to the terminal 12 through a resistor 16 and the collector-emitter path of a p-n-p transistor 17. The base of the transistor 17 is connected through a resistor 18 to the collector of an n-p-n transistor 19 having its emitter connected to the terminal portion 14 and its base connected to the junction of the resistor 16 and thermistor 15. Moreover, the terminal 12 is connected to the terminal portion 14 through a series circuit including a resistor 21, diodes 22, 23 and a resistor 24, the junction of the resistor 21 and diode 22 being connected to the collector of the transistor 17.

In use, the terminal 12 is connected to the positive terminal of the vehicle battery through a relay winding 25, which can if desired be controlled by the ignition switch. The winding 25 serves when energised to close a pair of normally open contacts 26 which completes a connection from the positive battery terminal to earth through a fan motor 27.

When the arrangement is connected to the battery, current flows through the winding 25, the resistor 21, the diodes 22, 23 and the resistor 24, but this current flow is very small and insufficient to energise the winding 25. The voltage drop across the diodes 22, 23 and resistor 24 appears across the resistor 16 and thermistor 15 in series, and so a portion of this voltage is applied to the base of the transistor 19. The resistance characteristics of the thermistor 15 are shown in FIG. 2, and the arrangement is such that below a temperature of about 90°C, the resistance of the thermistor 15 is low enough to ensure that the transistor 19 does not turn on. However, when a temperature of about 90°C is reached, the resistance of the thermistor 15 increases sufficiently to produce across the base-emitter of the transistor 19 a voltage which turns the transistor 19 on. The transistor 19 draws base current from the transistor 17, which in turn provides base current to the transistor 19, and so the trigger circuit constituted by the transistors 17 and 19 quickly switches to a state in which both transistors are fully conductive, and the winding 25 is energised to close the contacts 26 and energise the motor 27. The main current path for the winding 25 is by way of the transistor 17, the diodes 22, 23 and the resistor 24. There is of course now a substantially larger voltage drop across the resistor 16 and thermistor 15, and so in order to de-energise the relay 25, the temperature of the thermistor must fall to a value below 90°C. A typical differential is 3°C, so that the relay winding 25 is de-energised again at about 87°C.

As illustrated, it is preferred to have a separate earth connection for the thermistor 15 within the casing. If the thermistor 15 should become detached, the fan motor 27 will come on and stay on, giving a warning.

I claim:

1. A temperature sensitive electronic switching device for an externally powered DC load circuit automatically operable in response to a change in temperature to switch between a first state of high resistance and a second state of low resistance, said switching device thereby controlling current flow through said DC load circuit, said switching device comprising in combination a casing, a single pair of terminals on said casing for connection in said DC load circuit, and a switching circuit means within said casing defining a series circuit between said terminal pair, said series circuit including a first resistor, a first normally non-conductive transistor disposed across said resistor, a second normally non-conductive transistor regeneratively coupled to said first transistor, and a biasing means for said second transistor including a positive temperature coefficient thermistor, said biasing means automatically turning on said second transistor upon a rise in temperature above a preselected value to regeneratively switch on said first transistor and thereby provide a low resistance current path between said terminal pair by-passing said resistor, said biasing means further automatically serving to turn off said second transistor upon a subsequent decrease in temperature below said preselected value to switch off said first transistor and thereby provide a high resistance current path between said terminal pair through said resistor.

2. An arrangement as claimed in claim 1 in combination with a road vehicle, a first one of said pair of terminals on said casing being mounted on a part of the road vehicle so as to be earthed, and a second one of said pair of terminals being connected to the vehicle battery through a relay winding which when energised closes a normally open contact operating a cooling fan motor on the road vehicle.

3. An arrangement as claimed in claim 1 including a second resistor connected in series with said thermistor across a plurality of diodes, the plurality of diodes being connected between said pair of terminals so as to provide in use a supply to said thermistor when the switching device is in said first state.

4. An arrangement as claimed in claim 3 including a third resistor in series with said plurality of diodes.

5. An arrangement as claimed in claim 4 in which said plurality of diodes is connected to one of said pair of terminals through said first resistor.

6. An arrangement as claimed in claim 1 in which said casing is electrically conductive and constitutes one of said pair of terminals, the other of said pair of terminals being insulated from said casing.

7. An arrangement as claimed in claim 6 in which said thermistor is connected to the casing.

8. A temperature sensitive electronic switching arrangement comprising in combination a casing, one and only one pair of terminals on the casing, and a trigger circuit and associated thermistor within the casing, the thermistor having a resistance which increases with temperature and at a predetermined temperature drives the trigger circuit from a first state, in which a high resistance path is provided between the terminals, to a second state, in which a low resistance path is provided between the terminals, and in which the trigger circuit includes a first transistor having the thermistor connected across its base-emitter, and including a first resistor connected in series with the thermistor across a plurality of diodes, the plurality of diodes being connected between the pair of terminals so as to provide in use a supply to the thermistor when the trigger circuit is in its first state.

9. An arrangement as claimed in claim 8 including a resistor in series with the plurality of diodes.

10. An arrangement as claimed in claim 9 in which the plurality of diodes is connected to one of the terminals through a resistor which is bridged by the emitter-collector of a second transistor forming part of the trigger circuit first and second transistors being on when the trigger circuit is in its second state.

11. A temperature sensitive electronic switching arrangement comprising in combination an electrically conductive casing, an output terminal on but insulated from the casing, a series circuit coupling the output terminal and casing and including a resistor and a thermistor the resistance of which increases with increasing temperature, a transistor having its base-emitter connected across the thermistor, the transistor conducting in use when the resistance of the thermistor rises to a set value, said transistor forming part of a trigger circuit which switches on rapidly when the transistor starts to conduct, and provides a low resistance path between the output terminal and casing, and in which the trigger circuit includes a second transistor the base of which is fed by the first-mentioned transistor when the first transistor starts to conduct, the second transistor providing feedback to the base of the first transistor and also short-circuiting the resistor, and in which the series circuit between the output terminal and the casing includes the first-mentioned resistor, a second resistor and the thermistor in that order, the base of the first transistor being connected to the junction of the second resistor and thermistor, the collector of the first transistor being connected to the base of the second transistor through a third resistor, and the second transistor having its emitter connected to the output terminal and its collector connected to the junction of the first and second resistors.

12. An arrangement as claimed in claim 11 in which the emitter of the first transistor and the thermistor are connected to separate points on the casing.

13. An arrangement as claimed in claim 11 in which the junction of the first and second resistors is connected to the casing through a series circuit including a pair of diodes and a further resistor.

* * * * *